(No Model.)
J. A. GRAHAM, C. MARTINCOURT & H. F. CRANDALL.
HARVESTER.
No. 398,249. Patented Feb. 19, 1889.
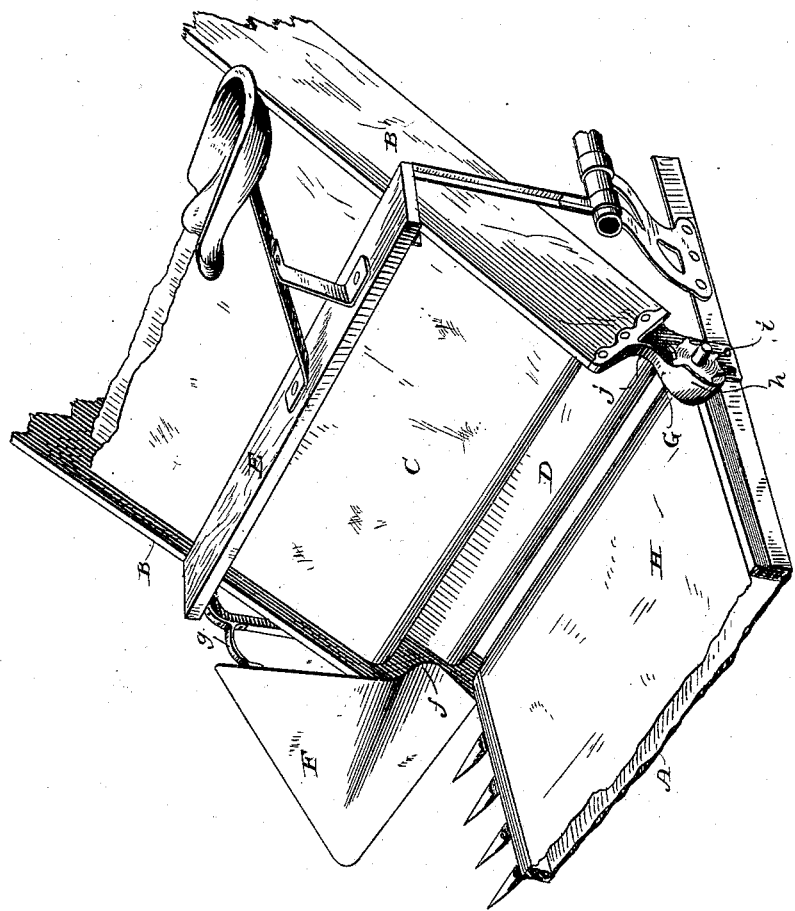
Witnesses.
Geo. W. Young.
N. E. Oliphant.
Inventors,
James A. Graham,
Charles Martincourt,
Henry F. Crandall
By Stout & Underwood
Attorneys,

United States Patent Office.

JAMES A. GRAHAM, CHARLES MARTINCOURT, AND HENRY F. CRANDALL, OF MILWAUKEE, WISCONSIN, ASSIGNORS TO THE MILWAUKEE HARVESTER COMPANY, OF SAME PLACE.

HARVESTER.

SPECIFICATION forming part of Letters Patent No. 398,249, dated February 19, 1889.

Application filed November 14, 1887. Serial No. 255,062. (No model.)

*To all whom it may concern:*

Be it known that we, JAMES A. GRAHAM, CHARLES MARTINCOURT, and HENRY F. CRANDALL, of Milwaukee, in the county of Milwaukee, and the State of Wisconsin, have invented certain new and useful Improvements in Harvesters; and we do hereby declare that the following is a full, clear, and exact description thereof.

Our invention relates to harvesters; and it consists in certain improvements in the lower portion of the elevator-frame and the front grain-guard, whereby the rise of the grain from the grain-platform apron is facilitated, as will be fully described and set forth hereinafter.

In the drawing, the figure is a perspective view of a portion of the elevator and grain platform, parts unnecessary to the proper showing of the invention being broken away.

A is the grain-platform, and B B' are the side timbers of the elevator-frame.

C is the upper, and D the lower, elevator apron or belt.

E is the seat-plank.

The edge of the lower end of timber B is cut out, as shown, and a guard, F, of sheet metal, is made to conform to the concavity $f$ and is secured therein, while the upper portion of the guard may be braced to the frame of the seat-plank by an arm, $g$. The lower end of timber B' has secured to it a casting, G, which is in turn secured to the rear sill of the frame of the grain-platform. This casting G has an opening in it, through which the inner shaft of the grain-apron H passes, and this casting is formed with a rearwardly-projecting flange, forming a guard or shield, $h$, that partly incloses the sprocket-wheel $i$, through which apron H is driven; and, further, this casting has a concavity, $j$, to receive the heads of the grain and prevent them from entering between the elevator-aprons ahead of the stalks.

In operation, as the grain is carried to the elevator-aprons by the apron H the butts of the grain that project forward from the platform will be received by the guard F, while the heads which project back to or beyond the rear edge of the platform will be received by the concavity of casting G, and both the heads and butts will be detained until the elevator-aprons have taken the body of the grain, and thus the grain will be carried evenly up with very little liability of being broken or tangled.

The described concavities $f$ and $j$ in the guard F and casting G, respectively, are located above the plane of the grain-platform in the grainward edges of said parts.

Having thus described our invention, what we claim as new, and desire to secure by Letters Patent, is—

1. The combination of the front side timber of the elevator-frame of a harvester having the upper portion of its lower end above the plane of the grain-platform, and provided with a concavity in its grainward edge, with a guard formed at an angle to said side timber and fitting into said concavity at its rear end.

2. The combination, in a harvester, of the rear side timber of the elevator-frame and the rear sill of the grain-platform, with a casting having a concavity in its grainward edge above the plane of the grain-platform and connecting the said parts.

3. The combination, in a harvester, of the rear side timber of the elevator-frame, the grain-platform having a grain-apron and a driving-shaft therefor carrying a sprocket-wheel at its rear end, and a casting having a concavity in the grainward edge above the plane of the grain-platform and connecting the said rear side timber with the rear sill of the said grain-platform and provided with a rearwardly-projecting flange partially encircling and forming a guard for the said sprocket-wheel.

In testimony that we claim the foregoing we have hereunto set our hands, at Milwaukee, in the county of Milwaukee and State of Wisconsin, in the presence of two witnesses.

JAMES A. GRAHAM.
CHARLES MARTINCOURT.
HENRY F. CRANDALL.

Witnesses:
H. G. UNDERWOOD,
N. E. OLIPHANT.